United States Patent [19]

Ekeroth et al.

[11] Patent Number: 5,267,285
[45] Date of Patent: Nov. 30, 1993

[54] APPARATUS FOR SUPPRESSING FORMATION OF VORTICES IN THE COOLANT FLUID OF A NUCLEAR REACTOR AND ASSOCIATED METHOD

[75] Inventors: Douglas E. Ekeroth, Delmont; Daniel C. Garner, Murrysville, both of Pa.; Ronald J. Hopkins; John T. Land, both of Pensacola, Fla.

[73] Assignee: Westinghouse Electric Corp., Pittsburgh, Pa.

[21] Appl. No.: 903,630

[22] Filed: Jun. 24, 1992

[51] Int. Cl.$^5$ .............................................. G21C 1/04
[52] U.S. Cl. .................... 376/352; 376/365; 376/393; 376/175
[58] Field of Search ............ 376/352, 399, 365, 393, 376/395, 175; 976/DIG. 167, DIG. 199, DIG. 191

[56] References Cited

U.S. PATENT DOCUMENTS

| | | | |
|---|---|---|---|
| 3,623,948 | 11/1971 | Dotson | 376/352 |
| 3,864,209 | 2/1975 | Tong | 376/352 |
| 3,878,870 | 4/1975 | Atherton et al. | 138/42 |
| 3,888,731 | 6/1975 | Finch et al. | 376/352 |
| 4,080,252 | 3/1978 | Redding | 376/281 |
| 4,657,730 | 4/1987 | Blaushild et al. | 376/285 |
| 4,997,620 | 3/1991 | Borois et al. | 376/400 |
| 4,997,621 | 3/1991 | Johansson et al. | 376/444 |

Primary Examiner—Donald P. Walsh
Assistant Examiner—Meena Chelliah
Attorney, Agent, or Firm—J. C. Valentine

[57] ABSTRACT

An apparatus and method are provided for suppressing the formation of vortices in circulating coolant fluid of a nuclear reactor. A vortex-suppressing plate having a plurality of openings therein is suspended within the lower plenum of a reactor vessel below and generally parallel to the main core support of the reactor. The plate is positioned so as to intersect vortices which may form in the circulating reactor coolant fluid. The intersection of the plate with such vortices disrupts the rotational flow pattern of the vortices, thereby disrupting the formation thereof.

12 Claims, 2 Drawing Sheets

APPARATUS FOR SUPPRESSING FORMATION OF VORTICES IN THE COOLANT FLUID OF A NUCLEAR REACTOR AND ASSOCIATED METHOD

GOVERNMENT CONTRACT

The Government of the United State of America has rights in this invention pursuant to Contract No. DE-AC03-90SF18495 awarded by the Department of Energy.

BACKGROUND OF THE INVENTION

This invention relates generally to cooling systems for nuclear reactors, and, more particularly, to an apparatus and method for suppressing the formation of vortices in coolant fluid circulating within such reactors.

Generally, nuclear reactors include a cylindrically reactor vessel having a hemispherical lower end. Within the reactor vessel is the reactor core, supported by a main core support. The main core support is connected to the interior walls of the reactor vessel at or adjacent to the area where the cylindrical and hemispherical portions of the reactor vessel meet. Below the main core support, the hemispherical vessel defines a lower head, or lower plenum. A generally cylindrical downcomer surrounds the reactor core. Coolant fluid, typically water, is pumped into the downcomer. The coolant fluid circulates downwardly into the lower plenum. The hemispherical shape of the lower plenum assists in evenly circulating the coolant fluid therein. A plurality of reactor core coolant inlet openings are located on the underside of the main core support. Coolant flows from the lower plenum, into the core coolant inlet openings and upwardly into the core to cool the fuel assemblies.

In order to maintain adequate and uniform cooling throughout the core, it is important that a uniform coolant flow and pressure be maintained across all of the reactor core coolant inlet openings. Non-uniform coolant pressure or flow causes uneven coolant flow into the core, which results in uneven cooling of the fuel assemblies of the core. Uneven fuel assembly cooling may force the entire core to be derated to accommodate "hot assembly" locations. Non-uniform coolant flow and pressure may result if vortices or other flow disruptions form in the coolant fluid circulating in the lower plenum.

It is desirable to provide core monitoring instrumentation within the core of a nuclear reactor. Traditionally, the leads connecting such instrumentation to the exterior of the reactor exit the reactor vessel through a central portion of the hemispherical portion of the reactor vessel. A plurality of conduits carry the instrumentation lines through the lower plenum.

The presence of the conduits in the lower plenum assists in maintaining even coolant flow within the lower plenum and disrupting the formation of vortices in the circulating coolant fluid. Such vortices disrupt coolant flow and produce low pressure areas at the core coolant inlets which they intersect.

In newer reactors, it has become desirable for any instrumentation conduits to exit the reactor vessel other than through the lower plenum. It has been found that the absence of instrumentation conduits from the lower plenum permits vortices to form in the circulating coolant in the lower plenum. Accordingly, there is a need for a simple and inexpensive apparatus and method for effectively suppressing the formation of vortices in the coolant fluid circulating within the lower plenum of a nuclear reactor where instrumentation conduits are not present in the lower plenum.

SUMMARY OF THE INVENTION

The present invention has met the above-described needs.

This invention provides a generally planar plate which is suspended in the lower plenum of a reactor vessel below and generally parallel to the main core support. The plate has a plurality of openings therein which allow coolant fluid to flow therethrough. A plurality of support columns connect the upper surface of the plate with the lower surface of the main core support.

The plate is positioned within the lower plenum so as to optimize its vortex suppression effect. The plate's distance below the bottom of the main core support, its distance from the interior side walls of the reactor vessel and its distance above the center of the interior of the hemispherical portion of the reactor vessel may be selected so as to maximize vortex suppression. Preferably, the plate will be positioned so as to intersect any potential vortex at or near the center line of such vortex. Modelling techniques may be utilized to predict the locations where vortices are likely to form. The plate's diameter, its thickness and the size of the openings therein may also be varied to obtain maximum vortex suppression.

The vortex suppression plate may also be utilized to brace secondary core support columns which extend generally downwardly from the main core support. A secondary core support plate is typically disposed near the bottom of the center of the lower plenum.

It is an object of this invention to provide an apparatus and method for suppressing the formation of vortices in coolant fluid circulating in the lower plenum of a nuclear reactor.

It is another object of this invention to provide an apparatus and method for suppressing the formation of such vortices in reactors in which core monitoring instrumentation conduits are absent from the lower plenum thereof.

It is a further object of this invention to provide an apparatus and method for suppressing formation of such vortices which assist in maintaining uniform coolant flow and pressure to the reactor coolant inlets.

It is yet another object of this invention to provide an apparatus and method for suppressing formation of such vortices which produce minimal contribution to the pressure drop of the coolant fluid circulating within the lower plenum.

It is another object of this invention to provide an apparatus and method for suppressing formation of such vortices which are simple and relatively inexpensive.

It is a further object of this invention to provide an apparatus and method for suppressing formation of such vortices which are readily realized using existing hardware design and fabrication techniques.

These and other objects of the present invention will be more fully understood from the following description of the preferred embodiment of the invention with reference to the drawings appended hereto.

DESCRIPTION OF THE PREFERRED EMBODIMENT

Figure 1:
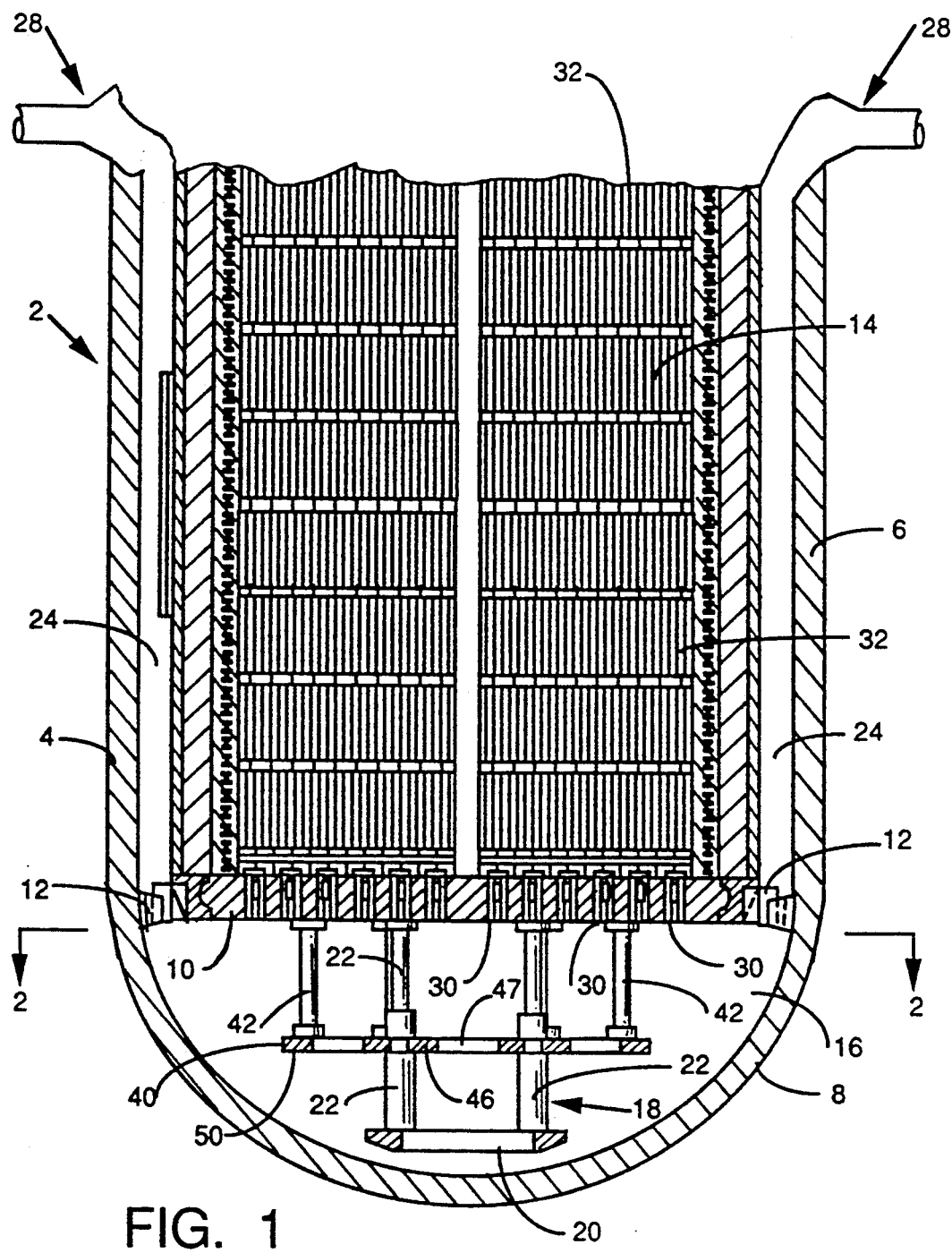
FIG. 1 is a longitudinal-sectional view through a lower portion of a nuclear reactor vessel showing an embodiment of the present invention.
Figure 2:
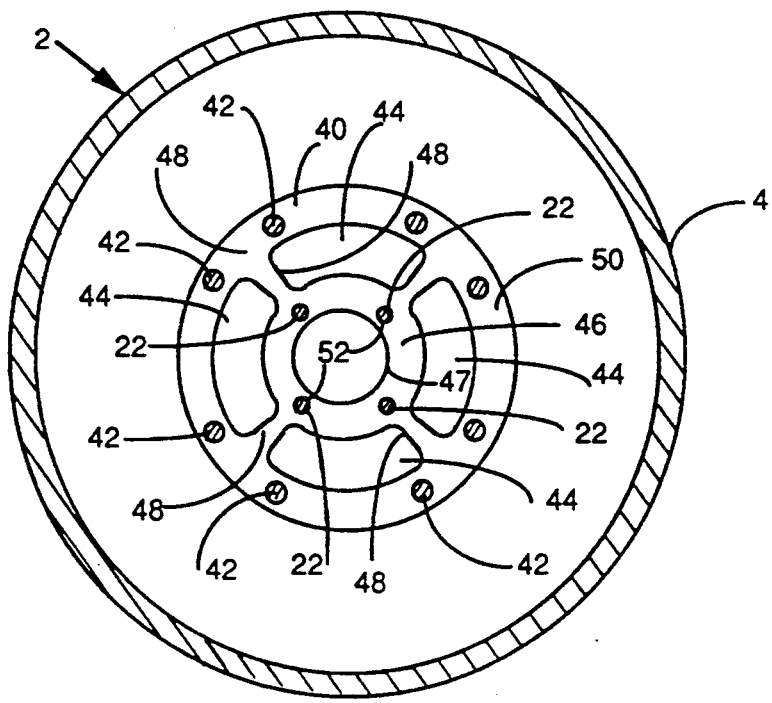
FIG. 2 is a cross-sectional view of the reactor vessel taken along the line 2—2 in FIG. 1.
Figure 3:
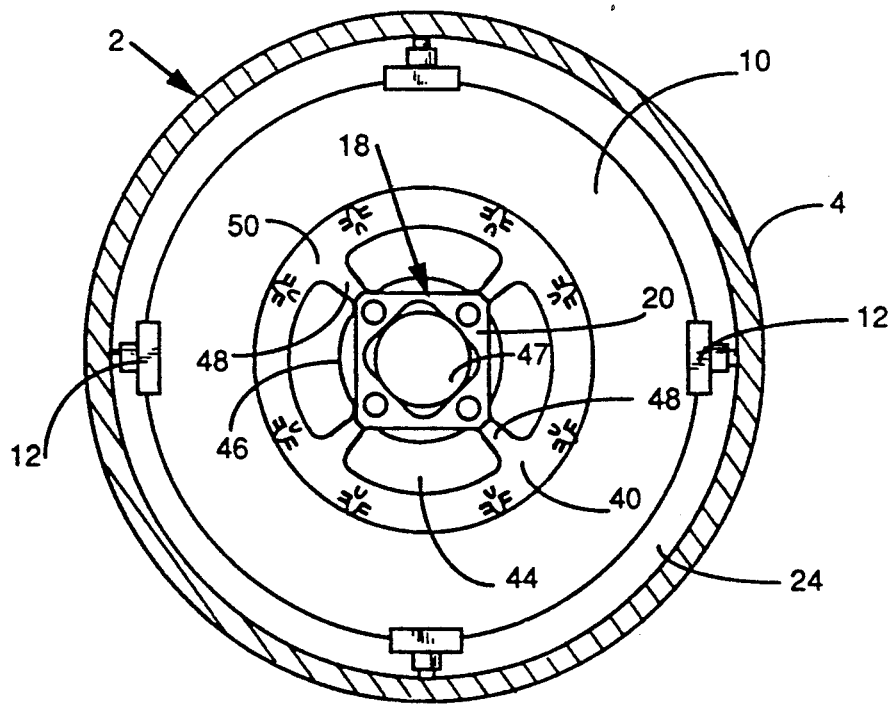
FIG. 3 is a bottom view of the nuclear reactor vessel with the bottom hemispherical end cut away.

Referring to FIGS. 1-3, there is shown a typical nuclear reactor 2. Reactor 2 includes reactor vessel 4 having a generally cylindrical portion 6 and a hemispherical portion 8 on one end thereof. Disposed within reactor vessel 4 is main core support 10, which is positioned with respect to the interior side walls of reactor vessel 4 and secured into position by brackets 12. Reactor core 14 is disposed above main core support 10 and is supported thereby. Lower head, or lower plenum 16, is defined between the underside of main core support 10 and the inner surface of hemispherical portion 8 of reactor vessel 4. A secondary core support 18 is located in a lower, generally central portion of lower plenum 16. Secondary core support 18 includes secondary core support plate 20 and a plurality of secondary core support columns 22 extending downwardly from main core support 10 to secondary core support plate 20. In a preferred embodiment, four secondary core support columns are provided. Secondary core support 18 is intended to prevent reactor core 14 from impacting the bottom of reactor vessel 4 in the event of a failure of main core support 10.

Generally annular downcomer 24 surrounds reactor core 14. The lower end of downcomer 24 extends around the outer edge of main core support 10 and is in communication with lower plenum 16. During operation of the reactor, coolant fluid, typically water, is pumped into the reactor through one or more cold legs 28. Each cold leg 28 is in communication with downcomer 24. The coolant fluid flows downward through downcomer 24 and into lower plenum 16. The coolant fluid flowing into lower plenum 16 circulates generally downwardly near the lower end of downcomer 24. The circulation becomes generally upwardly directed near the center of lower plenum 16. The coolant circulating within lower plenum 16 flows into a plurality of reactor core coolant inlet openings 30 located on the underside of main core support 10. Reactor core coolant inlets 30 extend through main core support 10 and are in communication with core 14. Coolant inlets 30 transmit the coolant fluid into core 14 to cool fuel assemblies 32. Upon passing through core 14, the heated coolant fluid is discharged from reactor vessel 4.

During normal operation, the reactor coolant system described above will be completely filled with coolant fluid. The fresh coolant flowing into the system through cold legs 28 maintains the coolant flow rate and pressure within the system. It is important that an evenly distributed coolant flow and uniform coolant pressure be provided to reactor core coolant inlets 30. As discussed above, non-uniform coolant flow and pressure across reactor core coolant inlets 30 may result in uneven cooling of fuel assemblies 32 during operation.

The apparatus of this invention includes generally planar vortex-suppressing plate 40 which is suspended below main core support 10 in lower plenum 16. Plate 40 is oriented generally parallel to main core support 10. A plurality of support columns 42 connect plate 40 to the underside of main core support 10. Support columns 42 extend from the upper surface of plate 40 to the underside of main core support 10. The ends of core support columns 42 are preferably connected to plate 40 and to main core support 10 by bolting or welding, however, any suitable fastening means may be used. In a preferred embodiment, eight support columns 42 are provided. The eight columns 42 are preferably angularly spaced around an outer circumferential portion of plate 40 and attach to main support 10 between reactor core coolant inlets 30. The adjacent support columns 42 are preferably substantially equally spaced about the circumference of plate 40. In a preferred embodiment, the distance between adjacent support columns 42 is about 25.5 to 37.7 inches.

As shown in FIGS. 2 and 3, plate 40 includes a plurality of openings 44, 47 therethrough. Openings 44, 47 permit the coolant fluid to flow through plate 40. In a preferred embodiment, four angularly spaced openings 44 are provided about a circumferential portion of plate 40 and at least one opening 47 is provided in a central portion of plate 40.

In a preferred embodiment, plate 40 includes a generally circular inner ring portion 46 having at least one opening 47 therein, a plurality of spaced spokes 48 extending generally radially outwardly from inner ring 46, and outer ring portion 50 connected to the outer ends of spokes 48. Outer ring 50 is separated from inner ring 46 by the spokes 48. Openings 44 are preferably defined between outer ring 50 and inner ring 46 and are separated from one another by the width of spokes 48. The ends of support columns 42 connected to plate 40 at outer ring 50.

Secondary core support columns 22 are preferably secured to inner ring 46 of plate 40. The connection of secondary core support columns to ring 40 braces columns 22 against undesired movement thereof caused by the action of the circulating coolant fluid on columns 22. Holes 52 may be provided through inner ring 46 through which secondary core support columns 22 are received. Secondary core support columns may be secured to plate 40 using bolts, welding or any other suitable means.

Referring again to FIG. 1, in a preferred embodiment plate 40 is positioned within lower plenum 16 about 2 to 4 feet below the underside of main core support 10. In addition, the perimeter of plate 40 is preferably positioned about 0.25 to 1 feet from the inner wall of reactor vessel 4. It has been found that this position will result in plate 40 intersecting vortices that may form in lower plenum 16 at or below the midpoint of such vortices, thereby maximizing the vortex-suppressing effect of plate 40. The intersection of plate 40 with such vortices will disrupt the rotational flow pattern of the vortices, thereby precluding the formation of continuous low pressure regions at the center lines of the vortices. As discussed above, suppression of vortex formation assists in maintaining uniform coolant flow and pressure at reactor core coolant inlets 30. It will be appreciated that while the above-described position of plate 40 within lower plenum 16 is the preferred location, the position may be varied in order to maximize vortex suppression within the lower plenum. For example, plate 40 is may be positioned in lower plenum 16 such that it is at a height above the central portion of lower plenum 16 that is equal to about 55 to 75 percent of the radius of curvature of hemispherical end 8 of vessel 4 which defines lower plenum 16.

Referring now to FIGS. 2 and 3, in a preferred embodiment, where the interior diameter of reactor vessel 4 is preferably 12 to 16 feet, the total diameter of plate 40 is about 7 to 9 feet. Inner ring 46 preferably has a diameter of about 3 to 6 feet a width of about 6 to 12 inches and opening 47 has a diameter of about 1½ to 5 feet. Each spoke 48 is about 1 to 2 feet long and about 6 to 10 inches wide. The distance between the outer perimeter of inner ring 46 and the inner perimeter of outer ring 50 is preferably substantially equal to the length of spokes 48. Outer ring 50 preferably has a width of about 6 to 12 inches. Plate 40 is preferably about 2 to 4 inches thick. It has been found that these dimensions provide optimum vortex suppression action in a nuclear reactor as described herein. Moreover, it is been found that a plate having these dimensions only minimally contributes to coolant pressure drop within the reactor vessel. However, it will be appreciated that the dimensions of plate 40 may be varied in order to provide optimum vortex suppressing action in any desired installation. For example, the total diameter plate 40 may be about 50 to 60 percent of the diameter of vessel 4 at cylindrical portion 6 and about 50 to 90 percent of the diameter of plate 40, as measured across openings 44, may be open.

Plate 40 is preferably made of steel using conventional fabrication techniques. However, it will be appreciated that plate 40 may be made of any suitable material.

Referring again to FIG. 1, the preferred method of this invention includes providing a vortex-suppressing plate 40 as described herein. Plate 40 is suspended in lower plenum 16 and nuclear reactor 2 such that is below and generally parallel to main core support 10. The preferred distance from main core support 10 to plate 40 is about 2 to 4 feet, however, it will be appreciated that this distance may be varied, as discussed above, to maximize the vortex-suppressing action of plate 40. The preferred method of this invention also includes circulating reactor coolant fluid in the lower plenum 16 for distribution to reactor core coolant inlets 30. As discussed herein, the presence of plate 40 within lower plenum 16 will suppress formation of vortices in the circulating coolant fluid because of the intersection of plate 40 with such vortices.

Whereas particular embodiments of this invention have been described for purposes of illustration, it will be evident to those skilled in the art that numerous variations in the details may be made without departing from the invention as defined in the appended claims.

What is claimed is:

1. Apparatus for suppressing formation of vortices in coolant fluid of a nuclear reactor having a main core support, a generally hemispherical lower plenum below said main core support and reactor core coolant inlets, said apparatus comprising:
   a generally planar plate suspended below the main core support in the lower plenum and disposed generally parallel to said main core support;
   a plurality of support columns connecting said plate to said main core support; and
   a plurality of openings through said plate maintaining uniform coolant flow and pressure across reactor core coolant inlets of the reactor wherein said plate includes a generally circular inner ring portion having at least one opening through a central portion thereof, a plurality of relatively spaced spokes extending generally radially outwardly from said inner ring, and an outer ring portion connected to outer ends of said spokes and separated from said central portion by said spokes, at least some of said openings being located between said inner ring and said outer ring and separated from one another by said spokes.

2. The apparatus of claim 1, wherein
   said support columns are connected to said outer ring portion.

3. The apparatus of claim 2, wherein
   said support columns are angularly spaced circumferentially around said outer ring portion.

4. The apparatus of claim 3, for the nuclear reactor further having secondary core support columns depending from said main core support, and wherein
   said secondary core support columns are secured to said inner ring of said plate to brace said secondary core support columns against movement.

5. The apparatus of claim 4, wherein
   said plate is positioned about 2 to 4 feet below said main core support.

6. The apparatus of claim 4, wherein
   said plate is positioned in said lower plenum at a height equal to about 55 to 75 percent of the radius of curvature said lower plenum.

7. Apparatus for suppressing vortices in coolant fluid circulating in a generally hemispherical lower plenum of a reactor vessel of a nuclear reactor, said nuclear reactor having a main core support disposed within said reactor vessel above said lower plenum and a plurality of reactor core coolant inlets through said main core support said apparatus comprising:
   a generally planar plate suspended in the lower plenum below and disposed generally parallel to the main core support of the reactor, said plate having a generally planar inner ring portion with an opening in a central portion thereof, four spaced spokes extending generally radially outwardly from said inner ring, an outer ring portion connected to outer ends of said spokes, and four relatively spaced openings defined between said inner ring and said ring portion and separated from one another by said spokes to maintain uniform coolant flow and pressure across the reactor core coolant inlets of the reactor;
   a plurality of support columns angularly spaced around said outer ring portion and connecting said plate to the main core support; and
   secondary core support means disposed in the lower plenum and having a plurality of secondary core support columns depending from said main core support, said secondary core support columns being secured to said inner ring of said plate to brace said secondary core support columns against undesired movement resulting from the circulation of the coolant fluid in the, lower plenum.

8. The apparatus of claim 7, wherein
   said plate is positioned about 2 to 4 feet below the main core support.

9. The apparatus of claim 8, wherein
   said plate is positioned in said lower plenum at a height equal to about 55 to 75 percent of the radius of curvature of said lower plenum.

10. A method of suppressing formation of vortices in reactor coolant fluid in a reactor vessel of a nuclear reactor, said reactor having a main core support, a generally hemispherical lower plenum and a plurality of reactor core coolant inlets disposed within said reactor vessel, comprising the steps of:

providing a generally planar vortex-suppressing plate having a generally circular inner ring portion having an opening in a central portion thereof, four relatively spaced spokes extending generally radially outwardly from said inner ring, on outer ring portion connected to outer ends of said spokes, and four relatively spaced openings defined between said outer ring and said inner ring and separated from one another by said spokes a plurality of openings therein;

suspending said plate in a lower plenum of said reactor beneath and generally parallel to the main core support; and circulating the reactor coolant fluid in said lower plenum past said plate for distribution to the reactor core coolant inlets.

11. The method of claim 10, further including:

suspending said plate about 2 to 4 feet below said main core support.

12. The method of claim 10, further comprising:

positioning said plate in said lower plenum at a height equal to about 55 to 75 percent of the radius of curvature of said lower plenum.

* * * * *